US012733586B2

(12) United States Patent
Somarowthu et al.

(10) Patent No.: US 12,733,586 B2
(45) Date of Patent: Sep. 15, 2026

(54) SYSTEM AND METHOD FOR CONTROLLING WINDROWER USING CROP CONSTITUENTS

(71) Applicant: Deere & Company, Moline, IL (US)

(72) Inventors: Mahesh Somarowthu, Pune (IN); Noel W. Anderson, West Fargo, ND (US)

(73) Assignee: Deere & Company, Moline, IL (US)

( * ) Notice: Subject to any disclaimer, the term of this patent is extended or adjusted under 35 U.S.C. 154(b) by 442 days.

(21) Appl. No.: 18/458,302

(22) Filed: Aug. 30, 2023

(65) Prior Publication Data

US 2025/0072327 A1 Mar. 6, 2025

(51) Int. Cl.
*A01D 43/10* (2006.01)
*A01D 57/00* (2006.01)
*G06T 7/00* (2017.01)

(52) U.S. Cl.
CPC ........... *A01D 43/102* (2013.01); *A01D 57/00* (2013.01); *G06T 7/0002* (2013.01); *G06T 2207/30188* (2013.01)

(58) Field of Classification Search
CPC .... A01D 43/102; A01D 57/00; G06T 7/0002; G06T 2207/30188
USPC ............................................................ 701/50
See application file for complete search history.

(56) References Cited

U.S. PATENT DOCUMENTS

2013/0028487 A1* 1/2013 Stager ..................... B07C 5/342
382/110
2017/0086381 A1* 3/2017 Roell ..................... A01D 91/04
2017/0089742 A1* 3/2017 Bruns ................ A01D 41/1273
2018/0325031 A1* 11/2018 Rotole ................. A01D 43/102
2023/0049727 A1* 2/2023 Hamilton ............ A01D 43/085

(Continued)

FOREIGN PATENT DOCUMENTS

EP 4023046 A1 7/2022

OTHER PUBLICATIONS

Sara Antognelli, “NDVI and NDMI vegetation indices: instructions for use,” Agricolus, May 29, 2018, [retrieved on Aug. 28, 2023], Retrieved from the Internet <URL:http://agricolus.com/en/vegetation-indices-ndvi-ndmi/>.

(Continued)

*Primary Examiner* — Erin M Piateski
*Assistant Examiner* — David Mesquiti Ovalle
(74) *Attorney, Agent, or Firm* — Tucker Ellis LLP; Michael G. Craig

(57) ABSTRACT

One or more techniques and/or systems are disclosed for determining appropriate settings and controlling windrower performance based on the constituents of the target crop. Crop condition and constituents can be identified in the field using sensors in/at the windrower implement, such as constituent sensors and/or imaging sensors. An implement controller can receive sensor data from the sensor array and generate crop condition data indicative of a condition of the target crop. The controller can also generate actuator adjustment data indicative of an adjustment to the roller assembly in the windrower implement to meet a target crop dry-down characteristic. One or more actuators can be used to adjust the roller assembly of the windrower implement based at least on the adjustment data, which can be done automatically or by an operator to the roller systems in the implement.

19 Claims, 7 Drawing Sheets

(56) References Cited

U.S. PATENT DOCUMENTS

| | | | | |
|---|---|---|---|---|
| 2023/0358707 | A1* | 11/2023 | Honeyman | A01D 43/085 |
| 2024/0012092 | A1* | 1/2024 | Schildknecht | G01S 17/50 |

OTHER PUBLICATIONS

"NDVI FAQ: All You Need to KNow About Index," EOS Data Analytics, [retrieved on Aug. 28, 2023], Retrieved from the Internet <URL:https://eos.com/blog/ndvi-faq-all-you-need-to-know-about-ndvi/>.

Giorgio Borreani, et al., "Effects of Mechanical Conditioning on Wilting of Alfalfa and Italian Ryegrass for Ensiling," Agronomy Journal, May 1999, Retrieved from the Internet <https://www.researchgate.net/publication/250103925_Effects_of_Mechanical_Conditioning_on_Wilting_of_Alfalfa_and_Italian_Ryegrass_for_Ensilin g>, DOI: 10.2134/agronj1999.00021962009100030016x.

* cited by examiner

SYSTEM AND METHOD FOR CONTROLLING WINDROWER USING CROP CONSTITUENTS

BACKGROUND

In an agricultural setting, crop materials are often cut, conditioned, arranged into windrows, and/or otherwise processed. In some cases, the crop materials may be raked, chopped, and/or baled as well. Certain work vehicles are provided for these activities. Some harvesting work vehicles and attachable equipment, such as conditioning work vehicles and/or windrowing work vehicles, may include implements for cutting, conditioning, and/or arranging the crop material into a windrow as the work vehicle moves across a field. Typically, the configuration of these implements may be changed or adjusted based on the target project/crop/situation. For example, the position of the implements on the work vehicle may be selectively changed, and these implements can also be manually adjustable for desired results in most cases.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for.

In one implementation of a system for adjusting a roller assembly on a windrower implement to improve drying rate for a target crop, a sensor array can be used to detect a condition of the target crop. An implement controller can receive sensor data from the sensor array, where the sensor data is indicative of one or more target crop characteristics. The implement controller can comprise a computer processor, and memory that stores instructions. The instructions can be configured to, when processed by the computer processor, generate crop condition data indicative of a condition of the target crop. The instructions can also be configured to generate actuator adjustment data indicative of an adjustment to the roller assembly in the windrower implement to meet a predetermined crop condition based at least the crop condition data and upon a target crop dry-down characteristic. One or more actuators can be used to adjust the roller assembly of the windrower implement based at least on the adjustment data.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
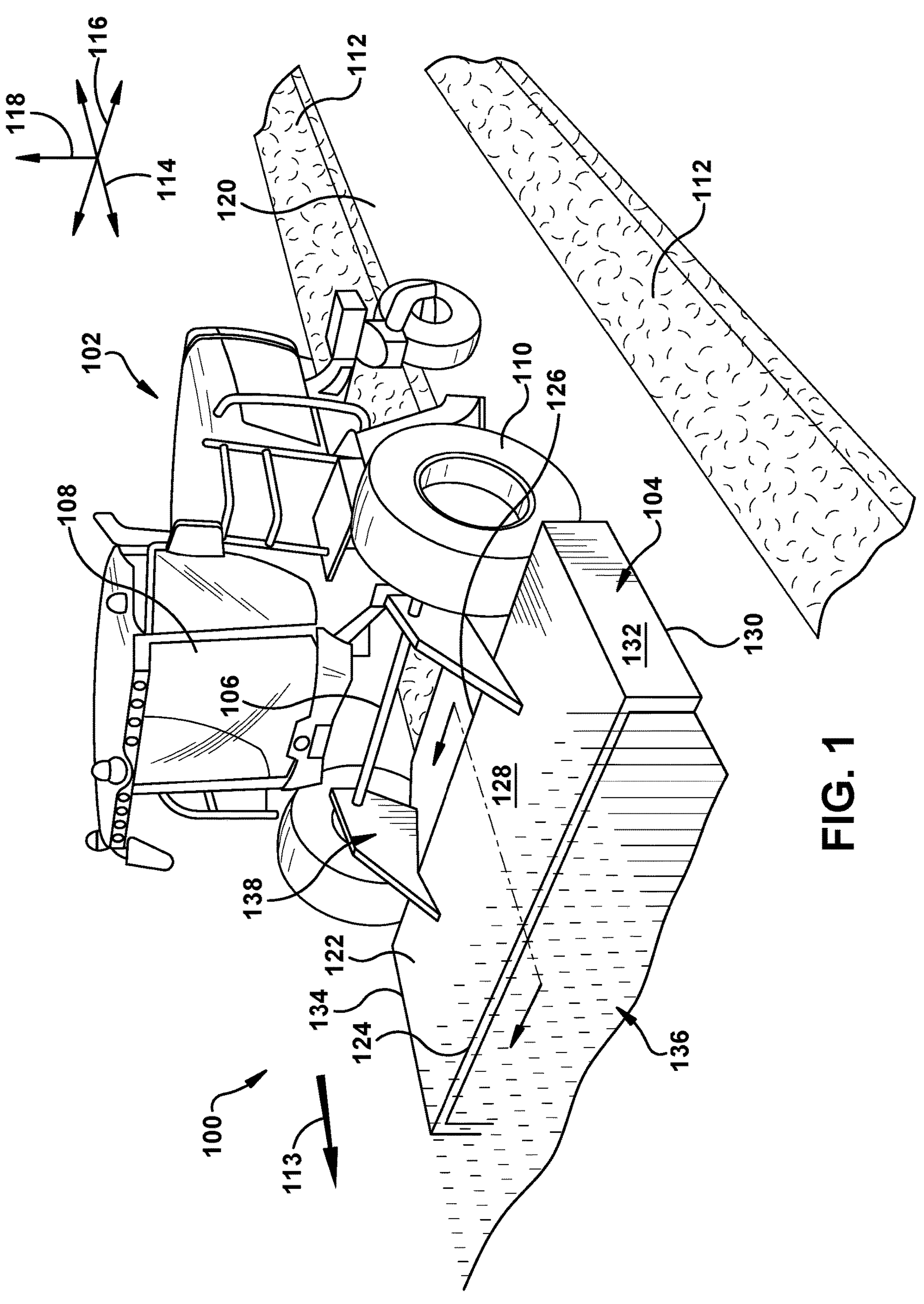
FIG. 1 is a component diagram illustrating one implementation of an example vehicle that may implement one or more systems and methods described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In some aspects, there is a desire to have a field of forage crop to dry down to a relatively uniform moisture content before collecting and baling/storing. Often, a crop's initial moisture content may very across a field or target operation location, as can the conditioning or dry-down characteristics for the crop (e.g., based on the effect of the crop content, density, type, moisture, crimp, sun, wind, humidity, windrow shape, etc.). Further, based on the operator's workload, expected weather conditions, end-use characteristics, capacity, etc., a desired dry-down time can be reduced for the conditioning, such that the conditioned crop can be collected within a reduced time period. In this way, for example, undesired conditions, such as potential rain events, may be avoided, while maintaining desired crop characteristics, such as improved crop content and reduced leaf loss.

As described herein, one or more systems and methods can be devised that provide for detecting a condition of a crop (e.g., being harvested), at a planned location, using planned equipment, and adjusting equipment settings to meet a desired dry down time while maintaining a desired level of crop constituents. The detected crop conditions can provide adjustment settings to an operator, and/or may provide for automatic adjustments using a controller to operate actuators in the equipment to make adjustments as needed to meet the target dry-down or crop characteristics.

For example, the detected crop conditions can provide for effectively adjusting roller assemblies in a windrowing implement, such as a roll gap and/or roll tension, speed of rollers, activating additional crimpers, for conditioning rollers in a rotary header for harvesting operations. In one aspect, these adjustments can facilitate crimping operation on a cut crop in order to improve dry down time (e.g., speed up dry down), while mitigating leaf loss of the crop being harvested, and other crop losses of constituents that may result from undesirable force applied to the cut crop during conditioning. For example, as described below, forage harvesting machines are used to cut a crop and create windrows of the resulting cut crop. The windrowing machine typically has a header coupled to the front (e.g., alternately the rear) of the machine. In this example, the header has a conditioner roller assembly, with conditioning rollers, which are used to crimp the cut crop to help it dry down. In some implementations, the adjustments can be made on the fly to meet the profile based on varied crop moisture levels in a target location. In this way, a more uniform crop moisture can be obtained for the collected crop, while maintaining desired crop condition.

That is, for example, the cut crop is crimped by the roller assembly, where the crimping action helps break the outer shell of the crop stems. This breakage of the shell facilitates moisture removal (e.g., through evaporation), resulting in a faster dry down of the harvested crop. In this example, a smaller roll clearance, results in greater crimping, which can result in an improved drying rate. However, a smaller roll clearance can also result in greater leaf loss, which is undesirable. Further, the roller assembly may comprise a plurality of rollers, where one or more may be activated to provide for additional crimping. Currently, an operator must pre-set the roll gap and roll tension in a known position to achieve a known drying rate, with an allowable amount of leaf loss. In this example, the adjustment must be made even during harvesting by the operator based on changing crop size and changing crop conditions.

In one aspect of the innovation described herein, a crop condition can be detected in the field, and/or by using historical data (e.g., known crop dry-down data and crop constituents from prior harvesting). In this aspect, crop conditioning instructions, such as a trained model, can be stored in memory, and executed by a processor. Further, the result of the analysis can generate one or more commands that actuate one or more actuators that vary crop conditioning characteristics for the planned equipment. The crop conditioning characteristics are adjusted to meet the desired (e.g., or a targeted result) crop moisture and/or crop conditions based on the crop moisture characteristics of the instant crop and the crop dry-down targeted thresholds.

As an illustrative example, FIG. 1 illustrates a component diagram of an example work vehicle and associated equipment that may utilize the techniques and system described herein. As illustrated in FIG. 1, a harvesting work vehicle, such as a windrower 100, is illustrated as one example implementations of an embodiment of the present disclosure. In some implementations, the windrower 100 may be a self-propelled machine. However, the systems and methods described herein may be equally applicable to towed machines, or other configurations, as will be appreciated by those having skill in the art. Furthermore, although harvesting work vehicles that mow, condition and windrow crop materials are sometimes interchangeably referred to as mower-conditioners, windrowers, or forage harvester, for the sake of simplicity, such machines will be referred to herein as "windrowers." Further, one or more portions of the methods and systems described herein may apply other harvesting work vehicles or to construction and forest harvester vehicles.

Machines that collect and condition crop material, and form a windrow from the same material are discussed according to implementations of the present disclosure; however, it will be appreciated that the present teachings may apply to machines that form windrows without necessarily conditioning the crop material. The present teachings may also apply so to machines that condition (crimp, crush, etc.) crop material without necessarily forming a windrow. Furthermore, the systems and methods of the present disclosure may apply to harvesting of various types of crop materials, such as grasses, alfalfa, silage, or otherwise. Accordingly, it will be appreciated that a wide variety of machines, systems, and methods may fall within the scope of the present disclosure.

In some implementations, the windrower 100 broadly comprises a self-propelled tractor 102 and a header 104 (i.e., header attachment). The header 104 may be attached to the front 138 of the tractor 102. The tractor 102 may include a chassis 106 and an operator compartment 108 supported atop the chassis 106. The operator compartment 108 may provide an enclosure for an operator and for mounting various user control devices (e.g., a steering wheel, accelerator and brake pedals, etc.), communication equipment and other instruments used in the operation of the windrower 100, including a user interface providing visual (or other) user control devices and feedback. The tractor 102 may also include one or more wheels 110 or other traction elements (e.g., tracks) for propelling the tractor 102 and the header 104 across a field or other terrain. The windrower 100 may form a windrow 112 as it moves along a travel direction indicated by the arrow 113.

The windrower 100 may define a coordinate system, such as a Cartesian coordinate system having a longitudinal axis 114, a lateral axis 116, and a vertical axis 118. The longitudinal axis 114 may be substantially parallel to the travel direction 113. The lateral axis 116 may be horizontal and normal to the longitudinal axis 114 to extend between opposing sides of the windrower 100. The vertical axis 118 may extend vertically and normal to the longitudinal axis 114, the lateral axis 116, and the ground 120.

The header 104 may generally include a frame 122, which is mounted to the chassis 106. The frame 122 may be mounted for movement relative to the chassis 106. For example, the frame 122 may move up and down, at least partly, along the vertical axis 118 relative to the chassis 106 and relative to crop material 136. In some implementations, the frame 122 may tilt and rotate about an axis that is parallel to the lateral axis 116. Also, the frame 122 may comprise one or more support elements for supporting implements (e.g., arrangement of implements, etc.).

The frame 122 may generally include a front end 124 and a rear end 126. The rear end 126 may be spaced apart along the longitudinal axis 114 and may be attached to the chassis 106 of the tractor 102. The frame 122 may also include a top structure 128 and a lower area 130, which are spaced apart along the vertical axis 118. Furthermore, the frame 122 may include a first lateral side 132 and a second lateral side 134, which are spaced apart along the lateral axis 116.

In the implementation illustrated in FIG. 1, and discussed below, the front end 124 is open to receive crop material 136 as the tractor 102 moves across the field. In some implementations, the windrower 100 cuts the crop material 136, then conditions the crop material, and then shapes, places and/or arranges the crop material 136 into the windrow 112 as the tractor 102 moves.

Figure 2:
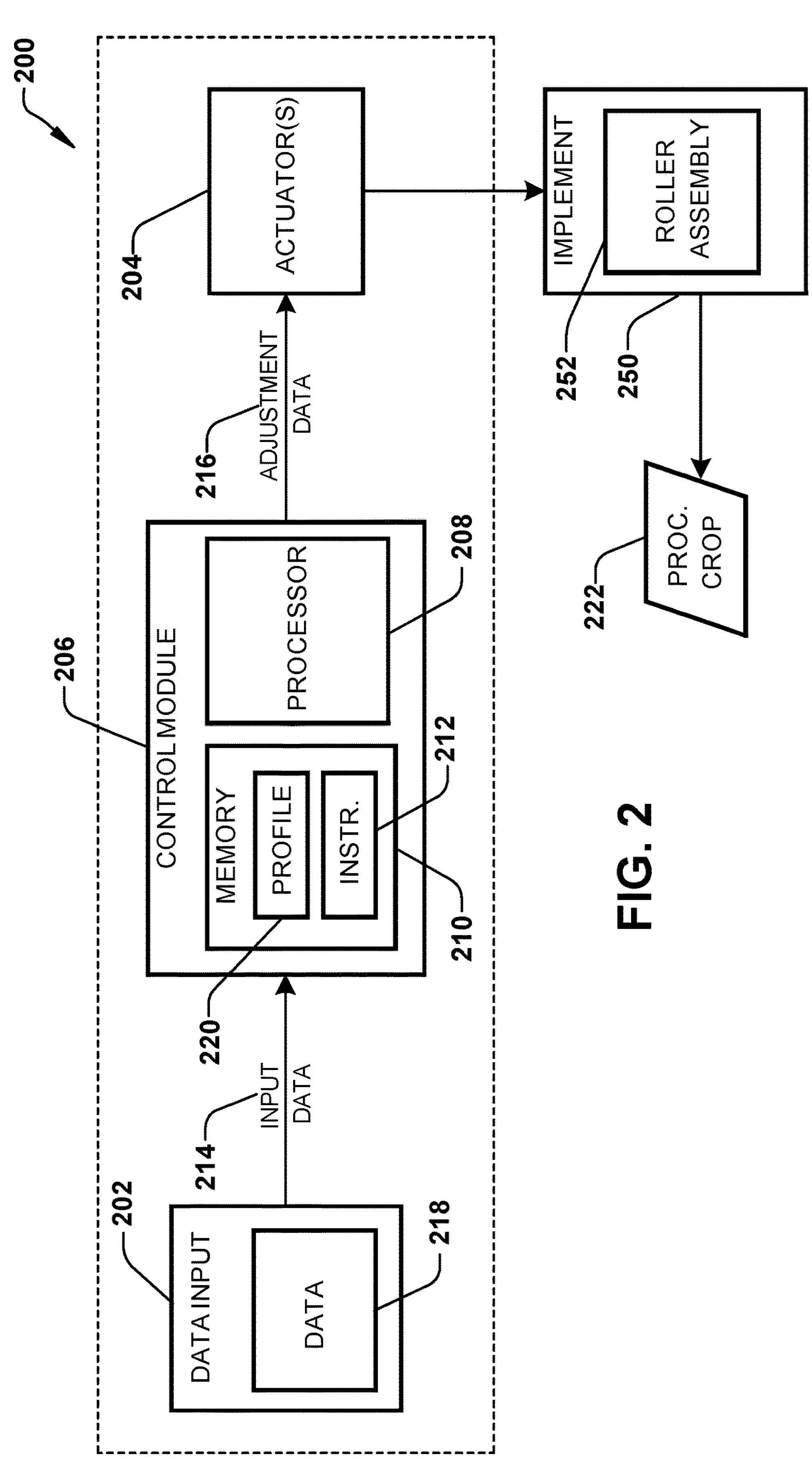
FIG. 2 is a schematic diagram illustrating one implementation of an example systems that can be used to perform roller gap adjustment, as described herein.
Figures 3A, 3B, 3C, 3D:
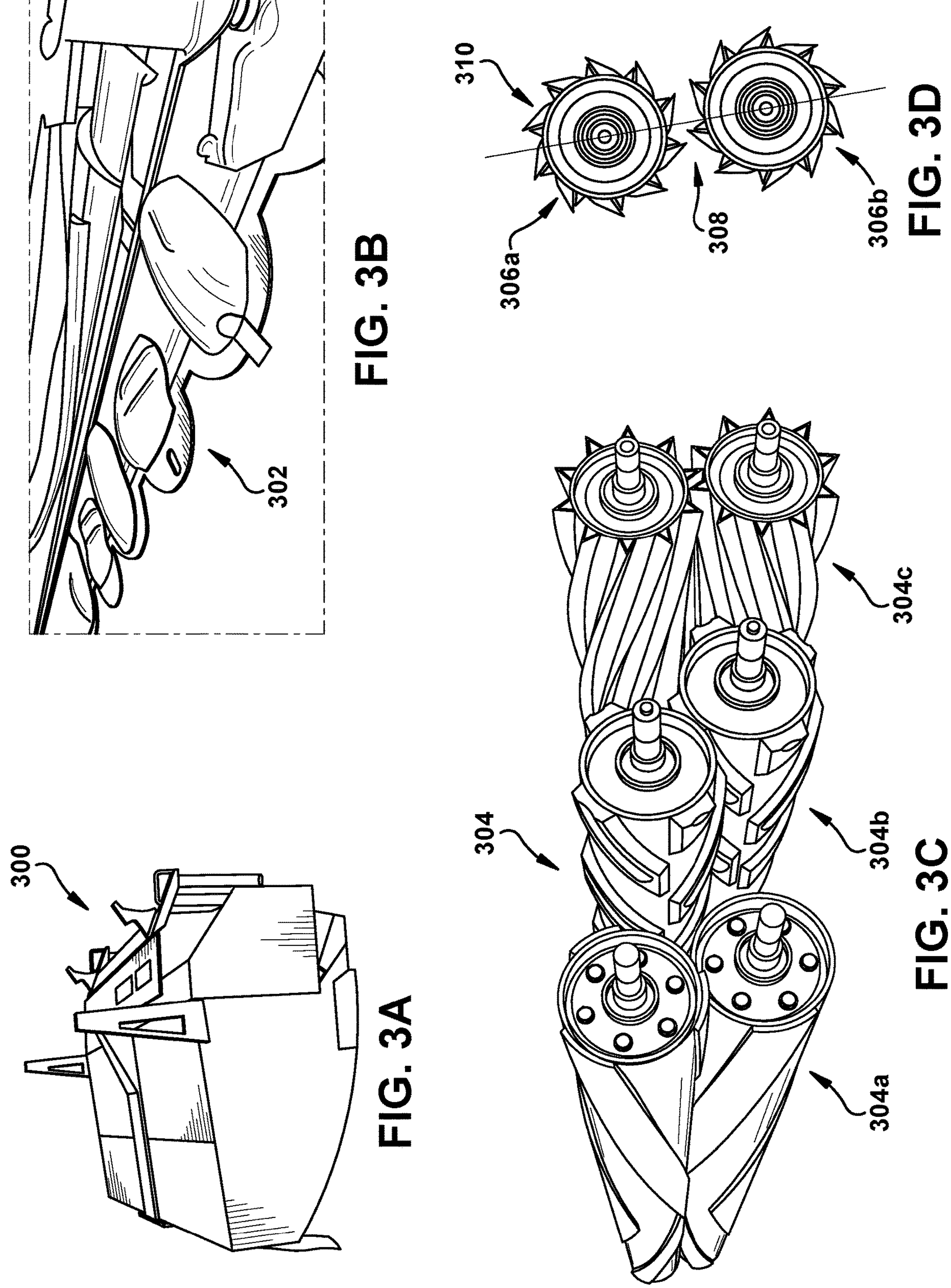
FIGS. 3A, 3B, 3C, and 3D are component diagram illustrating one example implementation of one or more portions of one or more systems as described herein.

FIG. 2 is a schematic diagram illustrating one example implementation of a system 200 for determining a condition of a crop during harvesting, in order to provide appropriate roller assembly adjustment information to adjust the assembly to reach a target dry-down time. In this implementation, the system 200 comprises a data input component 202, such as a database, crop model, user interface, cloud-based data, etc., (e.g., disposed remotely or in vehicle). The data input component 202 may also comprise a sensor array comprising one or more sensors to detect various conditions of the incoming crop and/or outgoing (e.g., constituent levels, leaf to stem ratio, NDVI health), along with other data. As an example, constituent levels of the crop may include moisture content, dry matter content, acid detergent fiber (ADF) content, neutral detergent fiber (NDF) content, lignin content, metabolized energy content, and crude protein, among others.

For example, a constituent sensor can comprise a near-infrared-reflectance (NIR) sensor, among other type of any suitable sensing technologies. As one example, constituent sensor can be the Harvest lab 3000™ from John Deere™, or similar, among other types of sensors that can provide information regarding the constituents of the crop residue. As another example, a terahertz sensor that is configured to generate and detect electromagnetic waves at terahertz frequencies (0.1 Thz to 30 Thz) can be used, with the detected electromagnetic waves being converted to electronic signals that can provide information regarding the constituents of the conditioned crop. Additionally, a constituent sensor may include moisture sensor or any other constituent sensor, used to identify crop moisture content (e.g. capacitive sensor, electromagnetic emitter/detector pair).

As another example, a crop vegetative index, such as normalized different vegetation index NDVI, can be used to detect a crop health and density. For example, NDVI can be determined using an imaging sensor (e.g., camera) that is sensitive to near-infrared (NIR) and visible light). The NDVI of a crop can identify healthy vegetation and density of the vegetation. In some implementations, sensors on the implement can be used to determine NDVI; in other implementations, data from remote imaging sensors (e.g., satellites) can be used.

As another example, leaf loss of the harvested crop can be identified, such as resulting from the cutting and conditioning of the harvested crop. As an example, one or more cameras and image processing devices can be used to quantify leaf loss. For example, a stem to leaf ratio can be identified using imaging data, where leaf loss may be identified based on a known threshold or range for a crop. As another example, a forward looking camera can identify a stem to leaf ratio prior to conditioning, and a rearward looking camera can identify stem to leaf ratio after conditioning (e.g., crimping in the rollers). The leaf loss can be identified by comparing the before and after conditioning ratios.

In FIG. 2, the input component 202 creates, includes, or receives data related to harvested crop conditions, such as crop constituents, health and density information, and stem to leaf ratio information. The data input component 202 collects the input data 214 indicative of the crop conditions, which can be used to create a profile of the crop for crop dry-down characteristics that also provide for a higher performance crop (e.g., high in desired constituents and low leaf loss). That is, for example, crop dry-down rate data may be known for certain crops, having known moisture content and other constituents (e.g., dry-down rate table). Further, the dry-down rate may be known for various conditioning profiles and constituent profiles. As such, for example, in order to reach a dry-down rate (e.g., faster) within a target range of leaf loss and desired constituents, a selected conditioning profile can be selected to reach the target rates. Therefore, the input data 214 can comprise the condition of the harvested crop in the field, the target or threshold moisture level to reach the desired dry-down in the target time, and the target condition of the crop (e.g., target constituent level and leaf loss).

In FIG. 2, the example system 200 comprises a control module 206 that is configured to receive the input data 214 and transmits adjustment data 216. That is, for example the control module 206 comprises a computer processor 208, that is configured to process data and instructions, and provide resulting data based on the processed data and instructions. Additionally, the control module 206 comprises memory 210 (e.g., computer memory, such as a device or system that is used to store information for use in a computer or related computer hardware and digital electronic devices, including short and long-term memory, temporary and permanent memory, and the like).

In this implementation, the memory 210 stores instructions 212 that are configured to, when processed by the computer processor 208, generate crop condition data that is indicative of a current condition of the harvested crop. Further, the instructions can be configured to generate actuator adjustment data 216. The actuator adjustment data 216 is generated by an analyzer (e.g., trained machine learning model) that determines an amount and type of adjustment that may be needed to meet a predetermined crop condition based at least the crop condition data and upon a crop dry-down characteristic of processed crop 222 (e.g., the target moisture, crop constituents, and leaf loss). That is, a predetermined crop condition 220 comprises data that is indicative of the desired a crop condition and target crop dry-down characteristics for the harvested crop. A determined amount of roller assembly adjustment is based at least upon the input data 214, the equipment specification, etc., and the profile 220, which will result in the desired crop conditioning for the processed crop 222. That is, for example, a machine learning model can be trained on data indicative of desired crop conditions, such as desired dry-down time, amount or type of conditioning, type of crop, weather conditions, environmental conditions, leaf loss, constituents, etc. In this way, the trained model comprises a stored algorithm that identifies the adjustment or specifications for the windrower implement 250 and roller assembly 252, which will produce the desired processed crop 222 in the target dry-down time selected by the operator, with the target constituent and leaf loss level, given the existing conditions.

In the example system 200, one or more actuators 204 can be used to adjust a roller assembly 252 of the windrower implement 250, on the fly based at least on received adjustment data 216. For example, the roller assembly 252 can comprise one or more sets of rollers. Each set can be adjusted by changing a roller gap, roller tension, and/or roller speed, which can adjust the crimping characteristics of the crop. Further, one or more sets of rollers can be activated to multiply treatment of the crop. That is, if one set is activated the crop is merely treated once. If more than one set of rollers is activated, the crop can be treated multiple times. In some examples, the sets of rollers may be identical. In other examples, the sets may be different. The differences may be related to the crop engaging surface of the rollers such as the raised pattern, the height/depth of the pattern, the pitch of surface elements such as spiral raised/sunk features, material, or other. In some examples the difference may be related to the diameter of the rollers. Within a set of rollers, there may be differences like those just described.

As an example, a target roll gap and/or roll tension can be estimated on-the-fly and applied to the roller assembly 252 based on header load measurements, crop parameters, and other data collected in real-time. Further, one or more additional rollers may be activated to apply additional crimping to the harvested crop, as needed. As an example, moisture distribution data indicative of moisture distribution of the crop in the harvested crop can be utilized, for example; and a control system can generate control signals to automatically adjust roll gap and/or roll tension, etc. in the roller assembly based on the processed data.

As one example, in FIGS. 3A, 3B, 3C, and 3D an example windrower implement can comprise a header 300 that is coupled to a vehicle, such as a tractor (e.g., 102 of FIG. 1). The header 300 comprises a set of cutters 302, such as rotating cutter blades, arranged in the front of the header 300 to cut down the harvested crop as it enters the header 300. Rearward of the cutters 302 is disposed one or more sets of rollers 304 that are configured to condition the harvested crop as it is drawn through the header 300 from the front to the rear. That is, for example, a first set of rollers 306*a, b* can be arranged with a gap 308 therebetween that is configured to allow the harvested crop to pass between the rollers, while crimping and/or pressure is applied to the crop passing through. Further, additional sets of rollers 304 can comprise a variety of designs 304*a, b, c* that can include ridges, treads, or other features in a desired pattern that applies a desired amount or type of crimping, depending on the harvested crop.

In some implementations a first roller 306*a* may be configured to translate toward and away from a second roller 306*b* along an axis of translation 310, while roller 306*b* remains stationary. In other configurations, roller 306*b* may be translatable, while roller 306*a* remains stationary. In other configurations both rollers 306*a*, 306*b* may translate along the axis of translation 310. In this way, in this configuration, the gap 308 can be effectively decreased and increased. With continued reference to FIG. 2, in one example, the adjustment data 216 received by the actuator(s) 204 can result in the actuator(s) 204 increasing or decreasing the gap 308 between the rollers 306*a*, 306*b* during operation of the header 300. In this way, the amount and type of conditioning (e.g., crimping) of the harvested crop can be adjusted during operation (e.g., harvesting), on-the-fly. As another example, a speed can be adjusted for respective one or more roller set 306, 304; and merely the first set 306 may be activated; or additional sets 304*a*, 304*b*, 304*c* can be activated to provide additional conditioning. The data input to the analyzer can help determine the amount and type of crimping needed to meet crop conditioning profile 220, which determines the adjustments needed to meet that profile.

As an example, an operator may determine that a specified amount of conditioning and/or crimping is desired for a certain crop (e.g., targeted for harvesting) to meet a moisture profile for target dry-down, with a desired or allowable amount of leaf loss and constituent level. In this example, the information may be based on the type of crop, the crop conditions, the field conditions, type of equipment, and/or the weather conditions (present and future), historical crop data, and the desired end result. For example, as described above, and increase in crimping can provide for a decrease in drying time for the harvested crop, which may be desirable when there is a smaller time window for harvesting (e.g., expected wet condition, expected rain, larger area for harvest, etc.). Further, different crops may have different conditioning requirements, such as those with different stem dimensions, foliage, lengths, and density or volume. Based on this information and more, the operator can select a desired conditioning, and therefore harvested crop input data, which will achieve a target drying time while mitigating leaf loss from the crop to an acceptable level. In some implementations, the operator may input the desired drying time and can select the conditioning applied based on the moisture profile (e.g., and predicted leaf loss).

Figure 4:
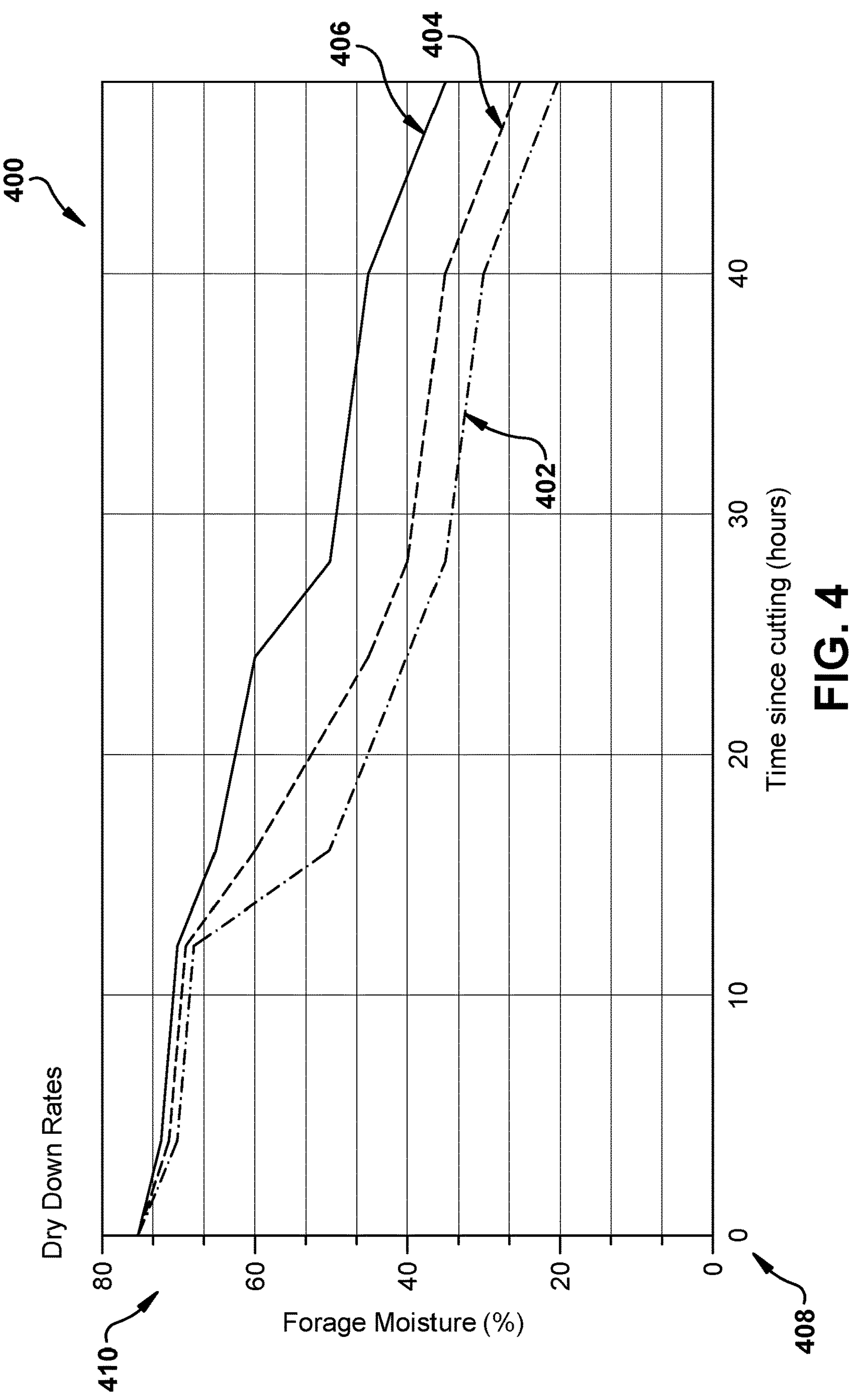
FIG. 4 is a graphical representation of data indicative of dry-down times associated with moisture content and conditioning characteristics.

FIG. 4 is a graphical diagram illustrating an example dry-down rate chart 400. In this example, the chart 400 show three different dry-down rates 402, 404, 406. Rate 402 illustrates a drying time for a non-conditioned crop, with moisture level 410 in the Y axis, and hours of dry-down time 408 in the X axis. Notably, the dry-down rate is slower than that of the single-conditioned crop rate 404, and the double-conditioned crop rate 402. As illustrated, an analysis (e.g., using the control module 206) of a desired dry-down time 408, based on a crop moisture level 410, can be identified by cross referencing the chart. Further, if an accelerated dry-down time is desired, additional conditioning (e.g., double conditioning 402) can be applied.

Further, Table 1, below, illustrates a dry-down chart that generally corresponds to the graphical illustration of FIG. 4. In this table, the crop moisture level is illustrated for respective "no conditioning," "single conditioning," and "double conditioning." As illustrated, the double conditioning column illustrates increased dry-down when compared to the single and no conditioning columns.

TABLE 1

| Dry-Down | Crop Moisture Level | | |
|---|---|---|---|
| Hours | No Cond | Single Cond | Double Cond |
| 0 | 75 | 75 | 75 |
| 4 | 72 | 71 | 70 |
| 12 | 70 | 69 | 68 |
| 16 | 65 | 60 | 50 |
| 24 | 60 | 45 | 40 |
| 28 | 50 | 40 | 35 |
| 40 | 45 | 35 | 30 |
| 44 | 40 | 30 | 25 |
| 48 | 35 | 25 | 20 |

Additionally, in some implementations, the data can be collected at regular intervals (e.g., or continually) and curated into a remote operations center, and loaded to a database with spatial and temporal indexing capabilities. As one example, the data may be analyzed as it is collected, and then, in combination with the location and time information, and the data records, determine potential adjustments for known equipment dimensions and characteristics. In this example, adjustments are identified, an adjustment record may be created or extended for the equipment receiving the load that contains pre-determined load metrics and characteristics, such as crop characteristics. As an example, this collection and curation of the data can be done automatically based on the load signals, location, and time match without need for operator intervention.

Figure 5:
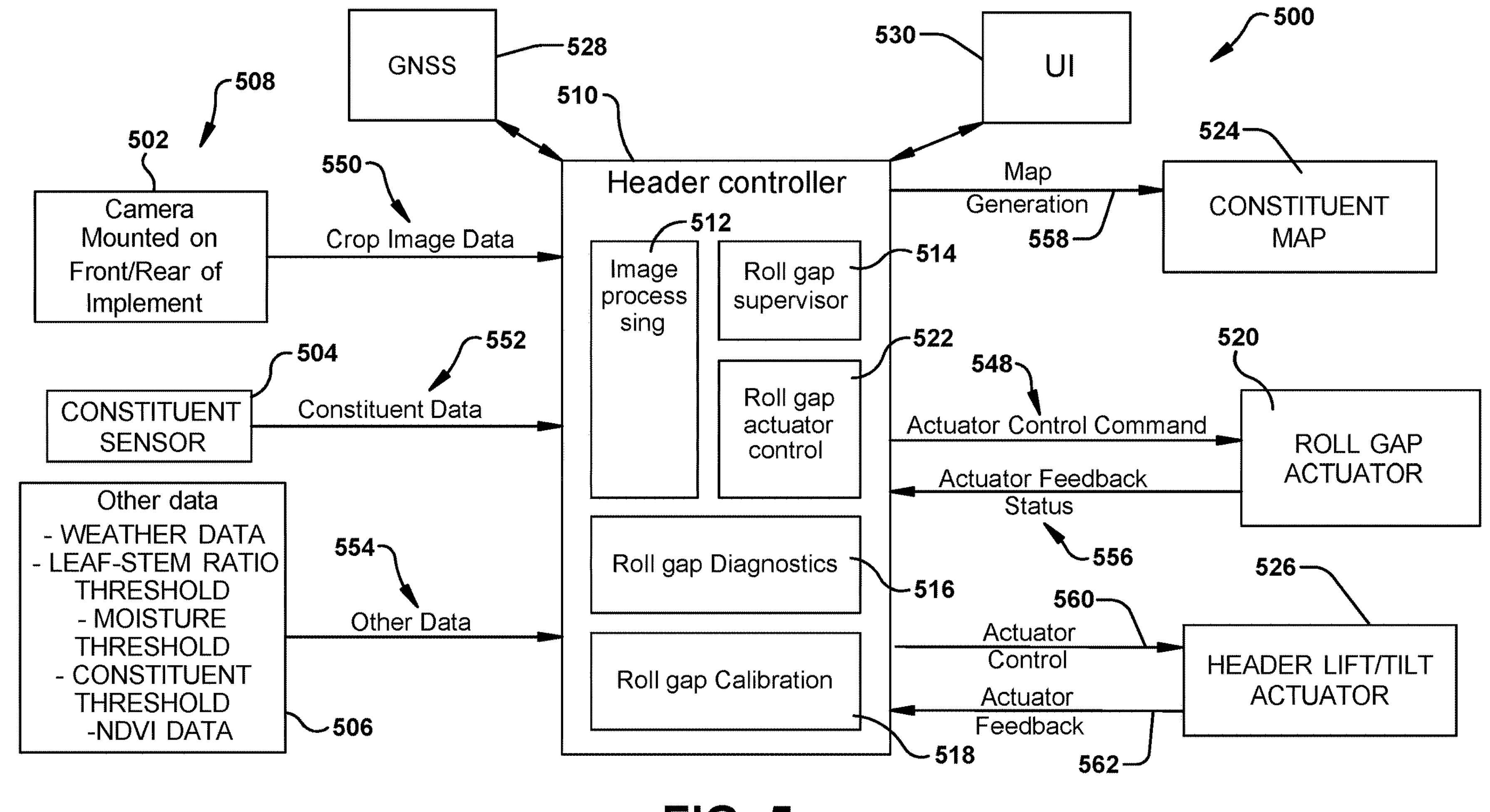
FIG. 5 is a schematic diagram illustrating one implementation of an example systems that can be used to perform roller gap adjustment or other windrower adjustment, as described herein.

FIG. 5 is a schematic diagram illustrating another example implementation of a system 500 that utilizes the innovative methods and systems described herein. In this example system 500, one or more imaging devices 502, such as a camera, which can be mounted on or proximate the windrowing implement (e.g., header), such at the rear side and/or the forward looking side relative to the roller assembly. As an example, the camera 502 can collect image data 550 of the harvested crop as it exits the header, and/or as it enters the header. In this way, for example, stem to leaf ratio information can be gathered from the image data 550. Further, a constituent sensor 504 can detect the constituent data 552, which can indicate an amount of various constituents in the harvested crop, such as moisture, and various other components described above.

Additionally, other data 506 can be collected, such as by a sensor array with one or more sensors, and/or as input from other components of the harvester and header systems, such as from a user interface (UI) 530, and/or global network satellite system (GNSS) 528 (e.g., remote database of historical data, current weather data, geolocation data, and imaging data for the target field). For example, other data can include the implement data (e.g., the current roll gap between the one or more sets of rollers in the roller assembly), weather data, the leaf-stem threshold for leaf loss, the moisture threshold for dry-down target, the constituent threshold, and the NDVI data. This other crop data 554 can be used to provide indications of the crop condition and processing effectiveness of the conditioning rollers. As an example, the data can be collected by various sensors, etc., which can form parts of a sensor array 508, which can include the camera 502, the constituent sensor 504, and other sensors and inputs for collecting the other data 506, such as the UI 530 and GNSS 528.

In the example system 500, a header controller 510 (e.g., a controller, control unit, etc., such as control module 206 of FIG. 2) may comprise a computer processor and memory (e.g., as shown in FIG. 2), which comprises instructions for performing various functions associated with the collected data. In this implementation, the processor and instructions may use the collected crop image data 550 to perform image processing 512. Image processing can comprise a variety of technologies used to process images for a particular purpose, for example, which may include performing edge detection on image data 550 generated by the sensor array 508 to identify stems and leaves of the harvested crop (e.g., differentiate portions of the crop). Further, in some implementations, the image processing 512 may be used to identify boundaries of stems and perform feature matching to match with the predetermined conditioning for the harvested crop. For example, pre-programmed image data may be used to identify known or desired conditions for the harvested crop after conditioning, where the crop image data 550 collected in real-time can be compared (e.g., matched) with the pre-programmed image data to determine the actual condition of the conditioned crop with respect to a known or desired condition. Additionally, the image processing 512 can be used to perform a multi-layered image classification of images generated from the crop image data 550, based at least on a classifier. That is, for example, the classifier can be used to determine the real-time characteristics of the conditioned crop from the crop image data 550.

As illustrated in FIG. 5, the crop constituent data 552, along with the other crop data 554, and results of the image processing 512 can be combined to determine whether the roll gap needs to be adjusted (e.g., which may also include calibration), for example, to attain a desired conditioning result for the harvested crop. A roll gap supervisor 514 (e.g., comprising instructions stored in memory processed by a processor) can be used to monitor the roll gap in the one or more sets of rollers in the roller assembly of the header. A roll gap diagnostics module 516 (e.g., comprising instructions stored in memory processed by a processor) can receive diagnostics (feedback status data 556, 562) from a roller gap actuator 520 and header lift/tilt actuator 526, and the header itself (e.g., state data indicative of the current condition of the headers, rollers, etc.). A roll gap calibration module 518 (e.g., comprising instructions stored in memory processed by a processor) can be used to process the received data (e.g., from the sensor array) in real-time, in combination with diagnostics data for the header, actuator (s), and roller assembly to identify a potential adjustment for the roller gap (e.g., positive, negative, or zero adjustment). In some implementations, the roll gap calibration module 518 and/or the roll gap supervisor 514 can utilize the sensor data (e.g., processed image data, constituent data 552, and other crop data 554) from a plurality of sensors in the sensor array in a decision forest regression to identify the adjustment data. That is, a type of voting process can be used to identify or select the data or data sets that can be used to determine the desired adjustment for the roller gap.

In some implementations, the controller 510 can transmit actuator control commands 548, 560 (e.g., using a roll gap actuator control 522, such as comprising programming 212 resident on memory 210 processed by a processor 208) to a roll gap actuator 520 and/or header lift/tilt actuator 528. This can result in the roll gap actuator adjusting (e.g., or not) the distance of the gap between respective one or more sets of rollers in the roller assembly, and/or the header adjusting the lift (e.g., distance/height) or tilt of the header. For example, which results in an adjustment of the conditioning of the harvested crop, on-the-fly, during operation to meet the harvested crop condition.

Figure 6:
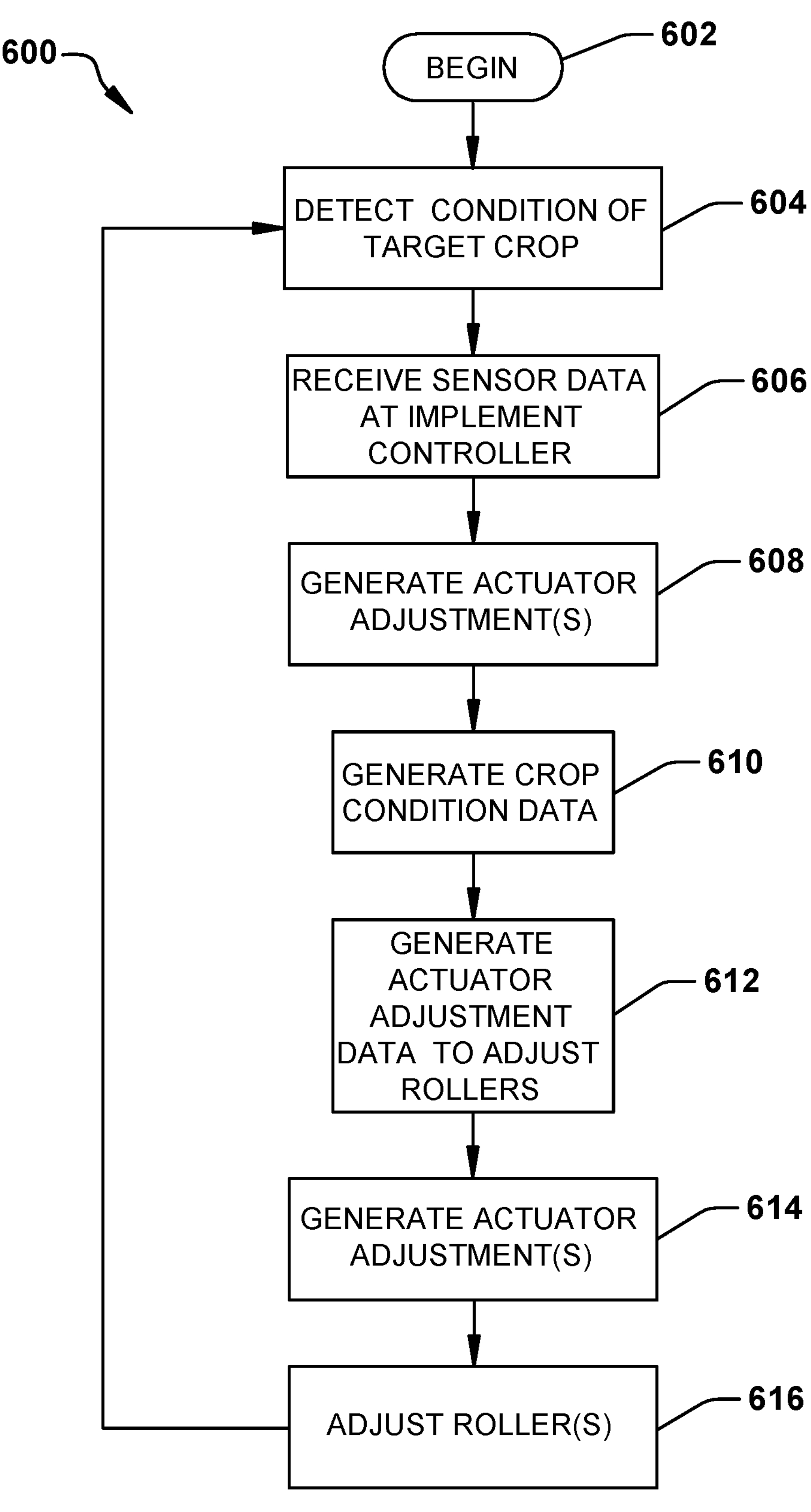
FIG. 6 is a flow diagram illustrating one implementation of an example method that can be used to perform roller gap adjustment or other windrower adjustment, as described herein.

FIG. 6 is a flow diagram illustrating an example method 600 for adjusting a roller assembly on a windrower implement to improve drying rate for a harvested crop, such as used for a system described above. The example method 600 begins at 602, and the method comprises detecting a condition of the harvested crop using a sensor array, at 604. In one implementation, detecting a condition of the harvested crop using a sensor array can comprise using a crop constituent sensor to detect one or more crop constituent conditions. For example, the sensor can detect moisture content, dry matter content, acid detergent fiber (ADF) content, neutral detergent fiber (NDF) content, lignin content, metabolized energy content, and crude protein content. Further, in some implementations, detecting a condition of the harvested crop using a sensor array can comprise using a normalized difference vegetation index (NDVI) sensing array to detect a health and density of vegetation of the harvested crop. In some implementations, detecting a condition of the harvested crop using a sensor array can comprise using an imaging sensor to capture image data of the harvested crop.

As one example, a crop constituent sensor (e.g., 504 in FIG. 5) can include a near-infrared reflectance (NIR) or Terahertz sensor. A NIR Sensor may be similar to, for example, the Harvestlab 3000™ from John Deere™, among other types of sensors that are capable of providing information regarding the constituents of the crop material. Further, a Terahertz sensor utilizes electromagnetic radiation with a frequency between 0.1 Terahertz and 30 Terahertz, defined herein as Terahertz electromagnetic radiation (Spectroscopy). This type of sensor is the subject of continued research and has shown promise for agricultural applications. For example, Terahertz radiation can provide an advantage of at least partial penetration into objects, but is not considered ionizing radiation, like X-rays. As such, Terahertz radiation may not trigger a requirement of certain regulations, as apply to X-rays, etc. Terahertz electromagnetic radiation may provide improved detection abilities over optical techniques, infrared, and/or ultraviolet applications.

At 606, the method comprises receiving sensor data from the sensor array at an implement controller. Here, the sensor data is indicative of one or more crop characteristics, such as the constituent make up of the crop, including moisture level, the health of the crop, such as determined by NDVI, and/or the stem to leaf ratio of the harvested crop. At 608, the implement controller is used to generate actuator adjustment data. Generating actuator data comprises, using a computer processor and instructions stored in memory in the implement controller. When the instructions are executed, crop condition data can be generated, at 610, where the crop condition data is indicative of a condition of the harvested crop. At 612, actuator adjustment data can be generated to adjust the roller. The actuator adjustment data is indicative of an adjustment to the roller assembly in the windrower implement to meet a predetermined crop condition based at least the crop condition data and upon a crop dry-down characteristic.

At 614, the actuator adjustments can be made, which result in the adjustments to the rollers at 616. In some implementations, the adjusting of the roller assembly can comprise adjusting one or more of: a speed of one or more sets of rollers in a roller assembly of the roller assembly; a pressure exerted by the one or more sets of rollers on the harvested crop; a distance between each roller in the one or more sets of rollers; and a number of active sets of rollers in the roller assembly. In the example method 600, the system can continue to detect the conditions of the harvested crop (e.g., return to 604), and iterate the process as needed.

In some implementations, the example method 600 can comprise using a crop condition map generator to generate a field map indicative of a crop condition at identified locations in a field comprising the harvested crop based at least on the crop condition data indicative of a condition of the harvested crop. That is, the harvested crop constituent data, the health and density data of the harvested crop, and the stem to leaf ratio data can be loaded to a map generation component, which can store the data and generate a map the displays indications of the identified crop conditions (e.g., for historical data collection, and/or visual representation to an operator). Further, in some implementations, the example method 600 can comprise using a user interface disposed at an operator position to display information indictive of the crop condition, a map illustrating crop condition, and/or a setting of the windrower implement. That is, for example, the crop conditions can be displayed to the operator on the user interface, along with proposed adjustments to meet thresholds for crop conditions, the actual thresholds, and calculated dry-down times, leaf loss, and other useful data. In this way, the operator can choose to make their own adjustments, use the automated adjustments, select to engage or disengage the adjustments, or make other harvesting decisions for adjusting the implement based on the displayed data.

Figure 7:
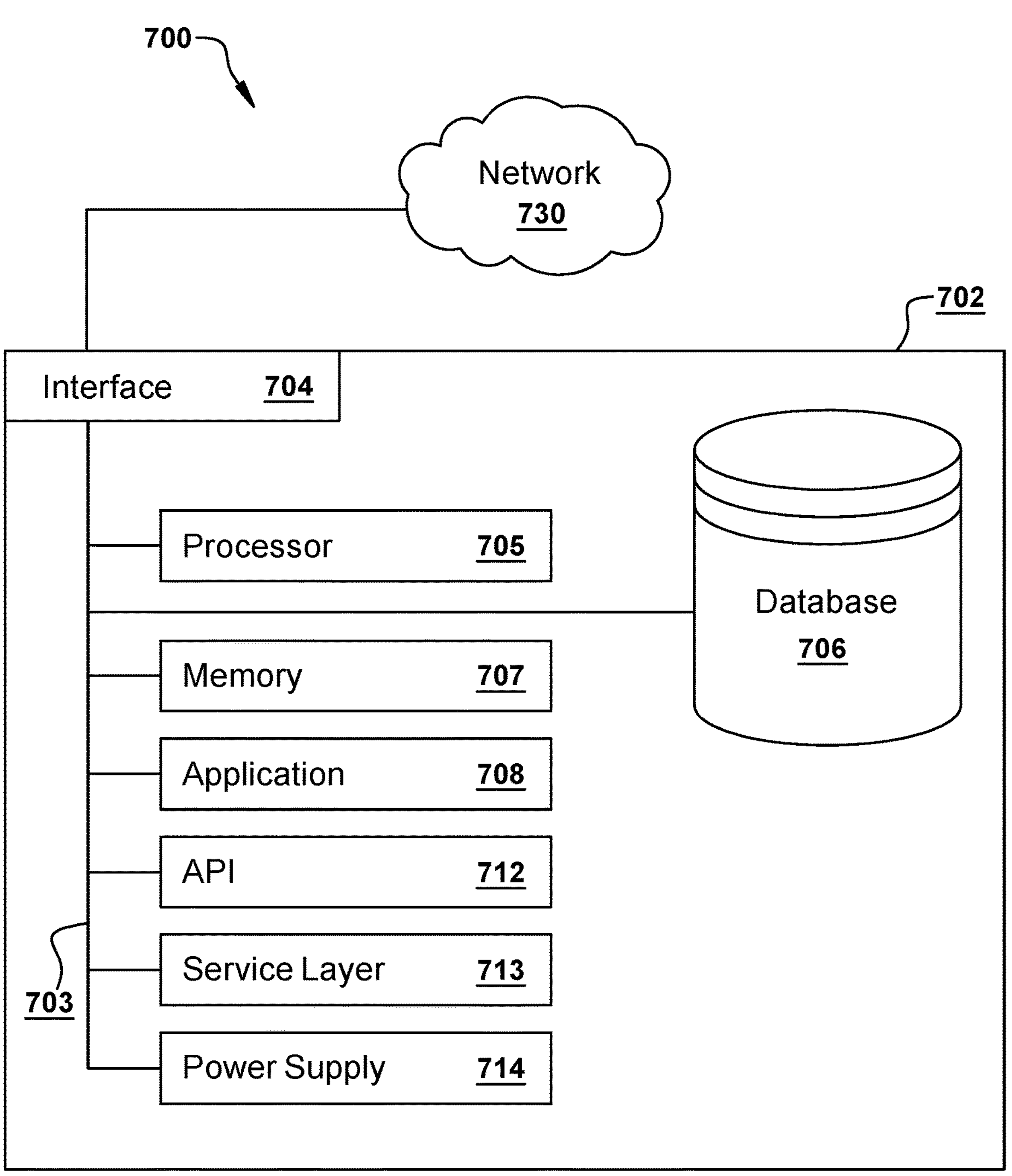
FIG. 7 is a schematic diagram of an example computer system that can be used to provide computational functionalities associated with methods and systems described herein.

FIG. 7 is a schematic diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for adjusting a roller assembly on a windrower implement to improve drying rate for a harvested crop, comprising:
- a sensor array that detects a condition of the harvested crop;
- an implement controller that receives sensor data from the sensor array, the sensor data indicative of one or more crop characteristics, the implement controller comprising:
  - a computer processor; and
  - memory that stores instructions configured to, when processed by the computer processor, generate:
    - crop condition data indicative of a condition of the harvested crop; and
    - actuator adjustment data indicative of an adjustment to the roller assembly in the windrower implement to meet a predetermined crop condition based at least on the crop condition data and upon a target crop dry-down characteristic; and
- one or more actuators that adjust the roller assembly of the windrower implement based at least on the adjustment data;
- wherein the target crop dry-down characteristic is indicative of a threshold crop condition that is configured to provide a target dry-down time for the harvested crop, and the stored instructions are configured to generate the actuator adjustment data based on a comparison between the identified crop condition and the target crop dry-down characteristic, and the actuator adjustment data is configured to provide adjustments to the roller assembly that result in the target dry-down time for the harvested crop.

2. The system of claim 1, the sensor array comprising a crop constituent sensor that detects and provides constituent data indicative of one or more of: moisture content, dry matter content, acid detergent fiber (ADF) content, neutral detergent fiber (NDF) content, lignin content, metabolized energy content, and crude protein content.

3. The system of claim 1, the sensor array comprising a normalized difference vegetation index (NDVI) sensing array that detects and provides plant health data indicative of a health and/or density of vegetation of the harvested crop.

4. The system of claim 1, the sensor array comprising an imaging sensor that captures image data of the harvested crop.

5. The system of claim 4, the stored instructions further configured to, when processed by the computer processor, identify a stem to leaf ratio based at least upon the image data.

6. The system of claim 1, the sensor data comprising one or more of: crop moisture content; crop density; crop health; acid detergent fiber (ADF) content; neutral detergent fiber (NDF) content; lignin content; metabolized energy content; crude protein content; and stem to leaf ratio of target crop.

7. The system of claim 1, the one or more actuators configured to adjust one or more of:
- a speed of one or more sets of rollers in the roller assembly;
- a pressure exerted by the one or more sets of rollers on the target crop;
- a distance between each roller in the one or more sets of rollers; and
- a number of active sets of rollers in the roller assembly.

8. The system of claim 1, the one or more actuators configured to adjust a height and/or tilt of a header in the windrower implement.

9. The system of claim 1, comprising a crop condition map generator that uses the crop condition data indicative of a condition of the harvested crop to generate a field map indicative of a crop condition at identified locations in a field comprising the harvested crop.

10. The system of claim 1, comprising a user interface disposed at an operator position, the user interface displaying information indictive of the crop condition, a map illustrating crop condition, and/or a setting of the windrower implement.

11. The system of claim 1, comprising a user interface configured to:
- display one or more of: the target crop dry-down characteristic; the harvested crop condition, and actuator adjustment data; and
- to receive user input indicative of one or more of: the target crop dry-down characteristic, and the actuator adjustment data.

12. A method for adjusting a roller assembly on a windrower implement to improve drying rate for a harvested crop, comprising:
- detecting a condition of the harvested crop using a sensor array;
- receiving sensor data from the sensor array at an implement controller, wherein the sensor data is indicative of one or more target crop characteristics;
- using the implement controller to generate actuator adjustment data, comprising using a computer processor and instructions stored in memory in the implement controller to:
  - generate crop condition data indicative of a condition of the harvested crop; and
  - generate actuator adjustment data indicative of an adjustment to the roller assembly in the windrower implement to meet a predetermined crop condition based at least the crop condition data and upon a target crop dry-down characteristic; and
- adjusting the roller assembly using one or more actuators of the windrower implement based at least on the adjustment data;
- wherein the target crop dry-down characteristic is indicative of a threshold crop condition that is configured to provide a target dry-down time for the harvested crop, and the stored instructions are configured to generate the actuator adjustment data based on a comparison between the identified crop condition and the target crop dry-down characteristic, and the actuator adjustment data is configured to provide adjustments to the roller assembly that result in the target dry-down time for the harvested crop.

13. The method of claim 12, wherein the adjusting the roller assembly comprises adjusting one or more of:
- a speed of one or more sets of rollers in a roller assembly of the roller assembly;
- a pressure exerted by the one or more sets of rollers on the harvested crop;
- a distance between each roller in the one or more sets of rollers; and
- a number of active sets of rollers in the roller assembly.

14. The method of claim 12, wherein detecting a condition of the harvested crop using a sensor array comprises using a crop constituent sensor to detect one or more of: moisture content, dry matter content, acid detergent fiber (ADF) content, neutral detergent fiber (NDF) content, lignin content, metabolized energy content, and crude protein content.

15. The method of claim 12, wherein detecting a condition of the target crop using a sensor array comprises using a normalized difference vegetation index (NDVI) sensing array to detect a health and density of vegetation of the harvested crop.

16. The method of claim 12, wherein detecting a condition of the harvested crop using a sensor array comprises using an imaging sensor to capture image data of the harvested crop.

17. The method of claim 12, comprising using a crop condition map generator to generate a field map indicative of a crop condition at identified locations in a field comprising the harvested crop based at least on the crop condition data indicative of a condition of the harvested crop.

18. The method of claim 12, comprising using a user interface disposed at an operator position to display information indictive of the harvested crop condition, a map illustrating crop condition, and/or a setting of the windrower implement.

19. A system for automatically adjusting a roller assembly on a windrower implement to improve drying rate for a harvested crop, comprising one or more of:

a sensor array that detects a condition of the harvested crop, the sensor array comprising:

a crop constituent sensor that detects one or more of: moisture content, dry matter content, acid detergent fiber (ADF) content, neutral detergent fiber (NDF) content, lignin content, metabolized energy content, and crude protein content;

a normalized difference vegetation index (NDVI) sensing array that detects and provides plant health data indicative of a health and/or density of vegetation of the harvested crop; and an imaging sensor that captures image data of the harvested crop;

an implement controller that receives sensor data from the sensor array, the sensor data indicative of one or more crop characteristics, the implement controller comprising:

a computer processor; and memory that stores instructions configured to, when processed by the computer processor, generate:

crop condition data indicative of a condition of the harvested crop comprising one or more of:

constituents of the harvested crop;

health of the harvested crop; and plant to stem ratio of the harvested crop;

actuator adjustment data indicative of an adjustment to the roller assembly in the windrower implement to meet a predetermined crop condition based at least on the crop condition data and upon a target crop dry-down characteristic, wherein the adjustment comprises and adjustment to a distance between rollers in the roller assembly; and one or more actuators that adjust the roller assembly of the windrower implement based at least on the adjustment data.

* * * * *